(12) United States Patent
Papin

(10) Patent No.: US 12,169,159 B2
(45) Date of Patent: Dec. 17, 2024

(54) SEAL-TESTING DEVICE FOR A DOUBLE-DOOR TRANSFER SYSTEM

(71) Applicant: GETINGE LIFE SCIENCE FRANCE, Vendome (FR)

(72) Inventor: Didier Papin, Selommes (FR)

(73) Assignee: GETINGE LIFE SCIENCE FRANCE, Vendome (FR)

( * ) Notice: Subject to any disclaimer, the term of this patent is extended or adjusted under 35 U.S.C. 154(b) by 170 days.

(21) Appl. No.: 17/755,161

(22) PCT Filed: Oct. 20, 2020

(86) PCT No.: PCT/FR2020/051884
§ 371 (c)(1),
(2) Date: Apr. 22, 2022

(87) PCT Pub. No.: WO2021/079053
PCT Pub. Date: Apr. 29, 2021

(65) Prior Publication Data
US 2022/0373425 A1    Nov. 24, 2022

(30) Foreign Application Priority Data
Oct. 25, 2019   (FR) ...................................... 1911997

(51) Int. Cl.
*G01M 3/28*     (2006.01)
*B01L 1/02*     (2006.01)
*G01M 3/32*     (2006.01)

(52) U.S. Cl.
CPC ............. *G01M 3/2869* (2013.01); *B01L 1/02* (2013.01); *G01M 3/3209* (2013.01); *B01L 2200/146* (2013.01)

(58) Field of Classification Search
CPC ..... G01M 3/2869; G01M 3/3209; B01L 1/02; B01L 2200/146
See application file for complete search history.

(56) References Cited

U.S. PATENT DOCUMENTS 3,400,580 A    9/1968 Haren et al.
3,875,790 A    4/1975 Herdzina et al.
(Continued)

FOREIGN PATENT DOCUMENTS

CH         427347 A    12/1966
DE      3126089 A1     1/1983
(Continued)

OTHER PUBLICATIONS

Search Report issued in French Patent Application No. 1911997 dated Sep. 15, 2020.
(Continued)

*Primary Examiner* — Jonathan M Dunlap
(74) *Attorney, Agent, or Firm* — Pearne & Gordon LLP

(57) ABSTRACT

Device for testing sealing of at least a part of a double-door sealed transfer system between two closed volumes, the system including a first flange and a and a second flange capable of being rigidly connected to one another, and a first door and a second door normally sealing openings respectively defined by the first and the second flanges, the device including a casing including a cavity provided with an opening, mechanical connection to a flange so that the cavity is closed by the flange and the door and an inflatable joint which, in the inflated state, is in contact with the flange and ensures a sealing allowing to verify the sealing between the flange and the door.

24 Claims, 4 Drawing Sheets

(56) References Cited

U.S. PATENT DOCUMENTS

| | | | |
|---|---|---|---|
| 5,421,626 A | 6/1995 | Glachet | |
| 5,756,882 A | 5/1998 | Cranfill et al. | |
| 6,591,662 B1 * | 7/2003 | Grimard | G01M 3/2869 |
| | | | 73/49.8 |
| 11,867,590 B2 * | 1/2024 | Papin | G01M 3/3281 |
| 2003/0200792 A1 | 10/2003 | Grimard et al. | |
| 2021/0123829 A1 * | 4/2021 | Papin | G01M 3/027 |

FOREIGN PATENT DOCUMENTS

| | | |
|---|---|---|
| EP | 0460511 A1 | 12/1991 |
| FR | 2640376 A1 | 6/1990 |
| FR | 2695343 A1 | 3/1994 |
| FR | 2787190 A1 | 6/2000 |
| JP | S55-101330 U | 7/1980 |
| JP | S55-162032 A | 12/1980 |
| TW | 201526021 A | 7/2015 |

OTHER PUBLICATIONS

International Search Report for Application No. PCT/FR2020/051884 dated Feb. 11, 2021.
Written Opinion for PCT/FR2020/051884 dated Feb. 11, 2021.
Search Report issued in corresponding Taiwan Patent Application No. 109136438, dated Apr. 18, 2024.

* cited by examiner

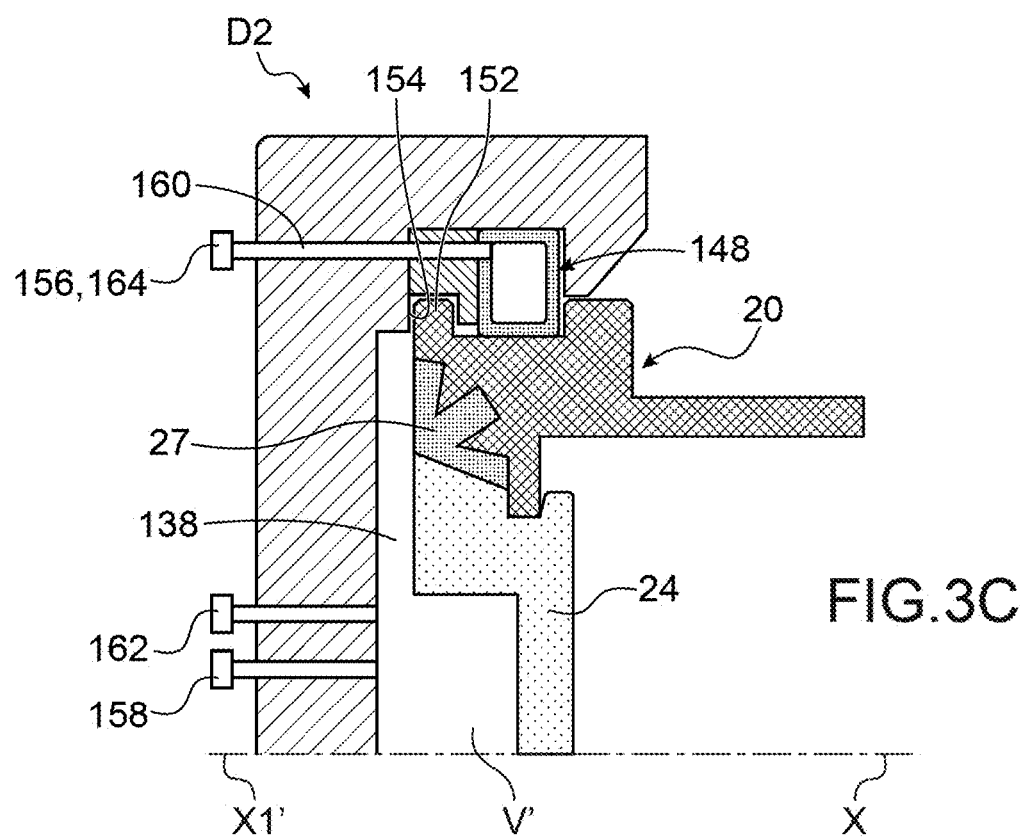

SEAL-TESTING DEVICE FOR A DOUBLE-DOOR TRANSFER SYSTEM

This is the National Stage of PCT international application PCT/FR2020/051884, filed on Oct. 20, 2020 entitled "SEALING TEST DEVICE FOR DOUBLE-DOOR TRANSFER SYSTEM", which claims the priority of French Patent Application No. 1911997 filed Oct. 25, 2019, both of which are incorporated herein by reference in their entirety.

TECHNICAL FIELD AND PRIOR ART

The present invention relates to a seal-testing device for a double-door transfer system with increased reliability.

In a certain number of industrial sectors, which include the nuclear, medical, pharmaceutical and agri-food sectors, it is necessary or desirable to carry out certain tasks in a confined atmosphere, either in order to protect the environment, for example from radioactivity, from toxicity, etc., or on the contrary to be able to carry out these tasks in an atmosphere that is aseptic or devoid of dust, or finally both simultaneously.

The transfer of apparatuses or of products from one closed volume to another, without at any moment the sealing of each of these volumes with respect to the outside being broken, poses a problem that is complicated to solvef. This problem can be overcome by a double-door connection device.

Such a double-door device provided with a control with multiple safeties is for example known from the document FR 2 695 343. Each volume is closed by a door mounted in a flange. Each door is rigidly connected to its flange by a bayonet link and the two flanges are intended to be rigidly connected to one another by a bayonet link.

For example one of the closed volumes is formed by an insulator and the other volume is formed by a container.

Conventionally the connection part carried by the insulator is designated alpha part and the connection part carried by the container is designated beta part.

Before the connection of the two closed volumes, it is desired to verify that each volume respects the sealing criteria in order to avoid any risk of inside or outside contamination during the connection of the two closed volumes.

One technique used to verify the sealing of each closed volume implements a device including a cavity, the opening of which is bordered by a thin and relatively rigid O-ring, the joint being intended to be applied against a fine surface of the flange of the alpha part or of the beta part, in order to define with it a test volume, the sealing of which with respect to the inner volume of the container or of the insulator is tested. For example a given level of pressure is generated in the volume and it is verified whether said pressure is stable over time.

The device is fastened onto the alpha part or the beta part for example via screws, so as to press the joint against the surface of the alpha part or the beta part.

The surface of the beta or alpha part against which the joint is intended to come in contact and ensure the sealing of the test volume from the outside is exposed to impacts during the manipulations. The risks of deterioration of this surface are thus significant, and the sealing of the test volume with the outside can be prevented, which leads to a negative result of the sealing test which would be false because of the absence of sealing between the joint and the surface. However, the small size of the O-ring and its rigidity do not allow to absorb the deterioration of the surface.

DISCLOSURE OF THE INVENTION

It is consequently a goal of the present invention to provide a device for testing sealing of at least a part of a double-door connection system having reliable operation.

The goal stated above is achieved by a seal-testing device that includes a cavity provided with an opening bordered by an inflatable joint, and means for fastening said device onto the part to be tested.

The device is mounted on the part to be tested and the joint is inflated so as to come in contact with the sealing surface of the part to be tested. The implementation of an inflatable joint allows to absorb the deteriorations undergone by the sealing surface. Indeed it provides great flexibility and can thus conform to the defects of the surface.

Moreover, in the casing in which the fastening of the device onto the part to be tested is obtained by a bayonet system, the implementation of an inflatable joint has the advantage of reducing friction and facilitates the connection. Moreover, there is no risk of the joint being deteriorated during the fastening.

Very advantageously, the fastening means use the means implemented to lock the flanges of the two closed volumes to one another, for example the bayonet or lever locking means. The fastening is facilitated and avoids the use of distinct means, for example screws.

The testing device is adapted to verify the two closed volumes.

One subject-matter of the present invention is therefore a device for testing sealing of at least a part of a double-door sealed transfer system between two closed volumes, said system comprising first and second flanges capable of being rigidly connected to one another, and first and second doors normally sealing openings respectively defined by the first and the second flanges, said device including a casing comprising a cavity provided with an opening, means for mechanical connection to at least one of the first and second flanges so that the cavity is closed by one of the first and second flanges and one of the first and second doors, and an inflatable joint intended to come, in the inflated state, in contact with one of the first and second flanges and to ensure a sealing allowing to verify the sealing between the first flange and the first door or the second flange and the second door.

Advantageously, the device includes means for inflating the inflatable joint and means for controlling the pressure in the cavity. The device can advantageously include a pressure switch to monitor the pressure in the inflatable joint.

For example, the casing includes a groove bordering the opening of the cavity and receiving the inflatable joint. Preferably the inflatable joint, in the deflated state, is housed entirely in the groove.

For example, the first and second flanges of the transfer system include means for locking to one another, and the mechanical connection means advantageously cooperate with the locking means of at least one out of the first and second flanges. Thus carrying out the sealing test does not require additional-connection means.

The mechanical connection means are for example of the bayonet type.

In one embodiment, the groove opens into a face of the casing so that the inflatable joint, in the inflated state, comes in contact with a face of the first or second flange substantially parallel to the face of the first or second door.

In another embodiment, the groove opens into the cavity of the casing so that the inflatable joint, in the inflated state, comes in contact with the radially outer periphery of the second flange.

For example, the first flange and the first door are those of an insulator and the second flange and the second door are those of a container.

Another subject-matter of the present invention is a method for testing sealing of at least a part of a double-door sealed transfer system between two closed volumes implementing a seal-testing device according to the invention, said method comprising the following phases:

Mechanically connecting the seal-testing device onto the first or second flange.

Inflating the inflatable joint to a given pressure.

Cycle of controlling pressure in the cavity.

Emitting a message on the sealing between the first flange and the first door or the second flange and the second door.

The method advantageously includes a step of monitoring the pressure in the inflatable joint throughout the duration of the test.

BRIEF DESCRIPTION OF THE DRAWINGS

The present invention will be better understood based on the following description and the appended drawings in which:

FIG. 3C is a longitudinal cross-sectional view schematically showing the seal-testing device of FIG. 3A mounted on a container, the joint being in the inflated state.

DETAILED DISCLOSURE OF SPECIFIC EMBODIMENTS

Figure 1:
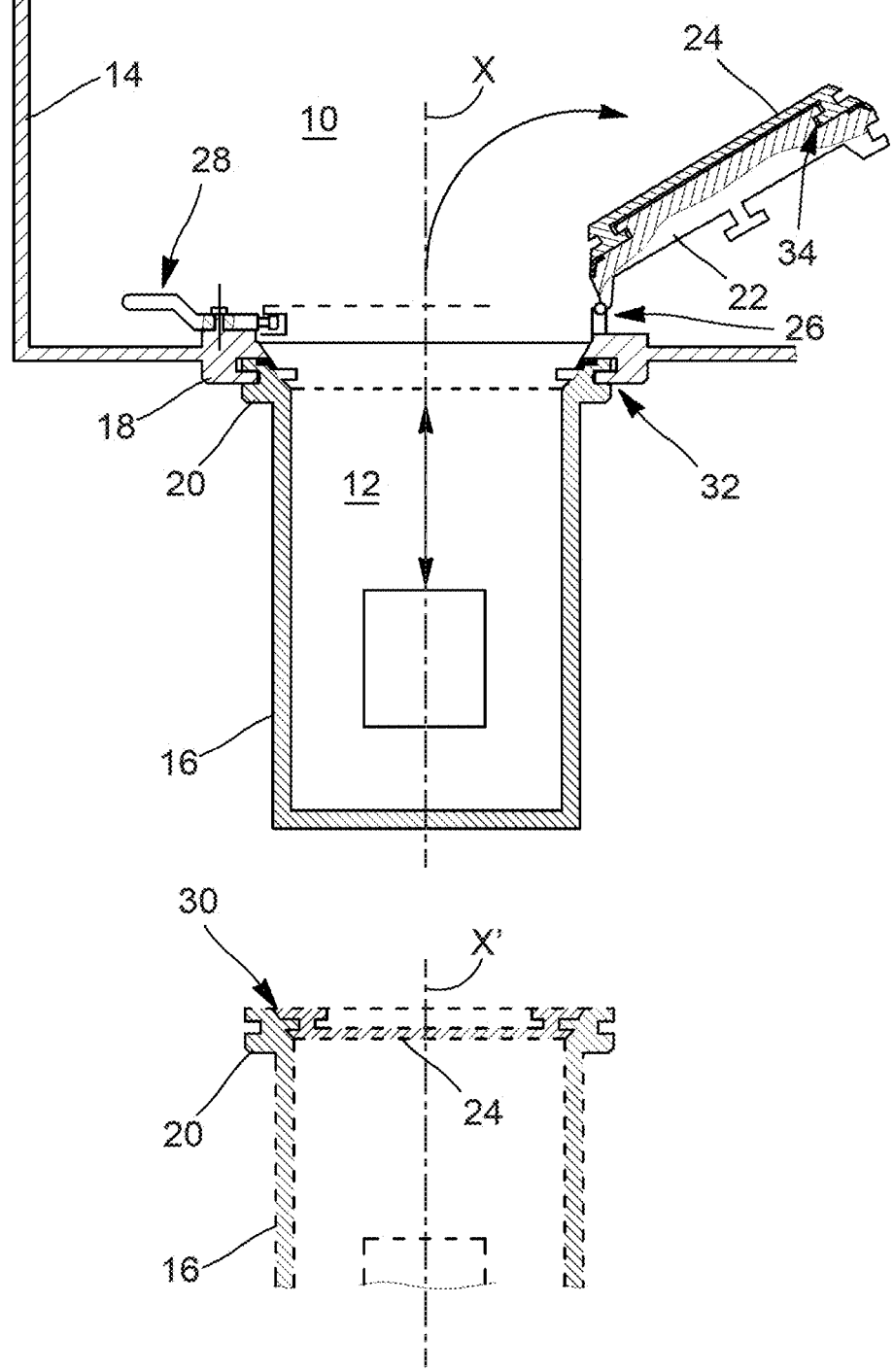
FIG. 1 is a longitudinal cross-sectional view schematically illustrating the connection of a container onto a cell via a double-door sealed transfer system by means of the bayonet type.

FIG. 1 shows a diagram of an example of a double-door transfer system.

In the following description the two closed volumes, the sealing of which is desired to be tested before their connection respectively correspond to an insulator 10 and to a container 12. It is understood, however, that the invention can also be applied in the casing in which the closed volumes are in a non-limiting manner for example a glove box for one and for the other a container or a glove box.

The insulator 10 is defined by a wall 14, only a part of which is visible in the drawings. It is conventionally equipped for example with means for remote manipulation such as remote manipulators and/or gloves (not shown) rigidly connected to the wall 14, via which the centralised control mechanism can be manoeuvred from the inside of this cell 10. The container 12 is also defined by a wall 16, as illustrated in particular in FIG. 1.

The double-door sealed transfer device mainly comprises an insulator flange 18, a container flange 20, an insulator door 22 normally sealing a circular opening defined by the insulator flange 18, and a container door 24 normally sealing an opening defined by the container flange 20. The insulator flange 18 and the container flange 20 are respectively fastened onto the wall 14 of the cell 10 and onto the wall 16 of the container 12. In this example, the door of the insulator 22 is articulated on the insulator flange 18 by a hinge 26.

Means designated in general by the reference 28 allow to control the opening and the closing of the doors 22 and 24.

For example, the fastening of the container door 24 onto the container flange 20 is ensured by a bayonet link 30 as is described in the document FR 2 695 343. For example, to allow the connection of the container flange 20 onto the insulator flange 18 and the connection of the container door 24 onto the insulator door 22, the double-door sealed transfer system also comprises two other bayonet links respectively designated by the references 32 and 34. The three bayonet links 30, 32 and 34 are arranged in such a way that after docking of the container flange 20 onto the insulator flange 18, a rotation of the container 12 about its axis, for example in the clockwise direction, has the effect of connecting the container flange 20 and the insulator flange 18, of connecting the container door 24 and the insulator door 22, and of disconnecting the container door 24 from the container flange 20. These two latter operations are carried out consecutively, in such a way that the opening of the container only occurs after the container door 24 has been connected to the insulator door 22 to form a double door.

The assembly formed by the insulator flange and the insulator door is routinely designated "alpha part". The assembly formed by the container flange and the door of the container is routinely designated "beta part".

In general the double-door transfer system has a symmetry of revolution about the axis X which is the axis of the insulator flange.

Figure 2A:
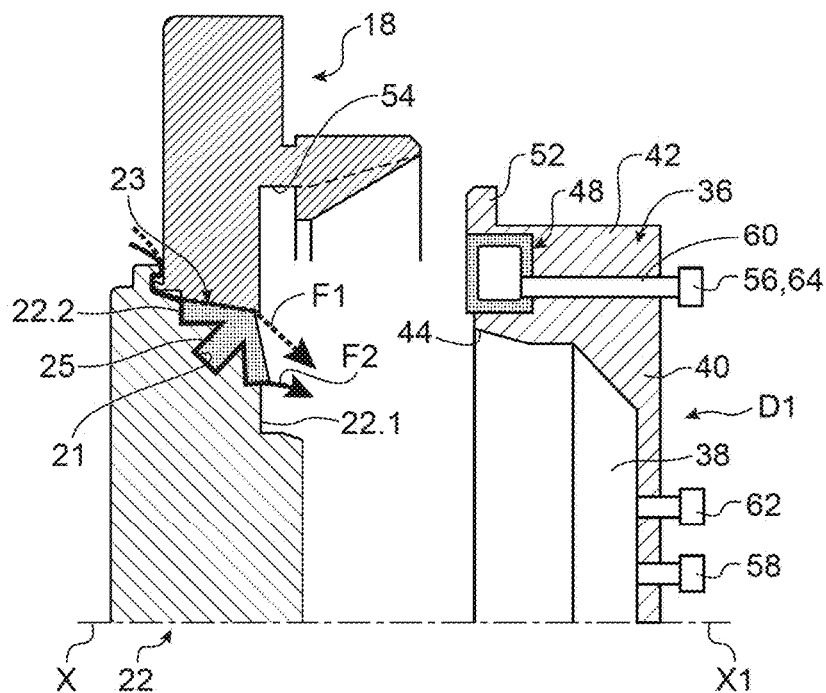
FIG. 2A is a longitudinal cross-sectional view schematically showing an example of a seal-testing device before its mounting on an insulator, the joint being in the non-inflated state.
Figure 2B:
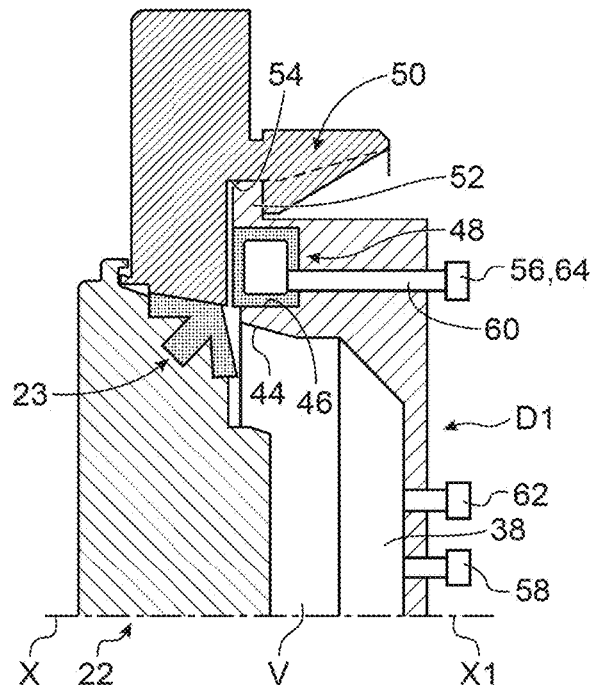
FIG. 2B is a longitudinal cross-sectional view schematically showing the seal-testing device of FIG. 2A mounted on the insulator, the joint being in the non-inflated state.
Figure 2C:
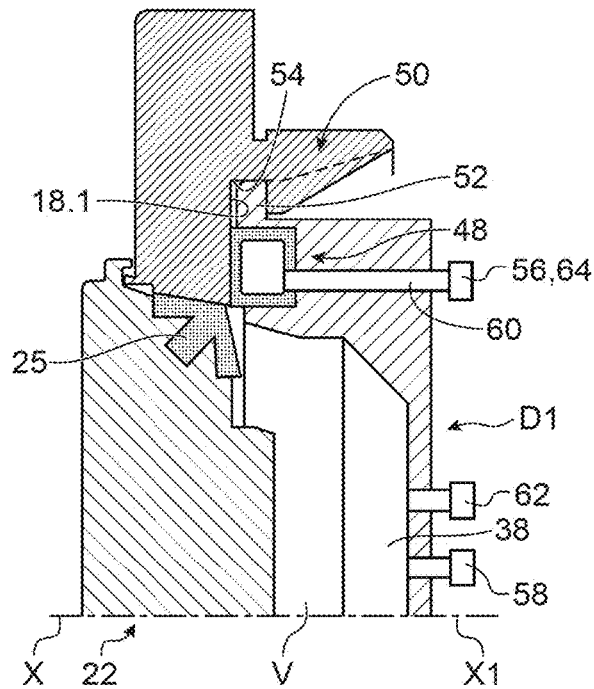
FIG. 2C is a longitudinal cross-sectional view schematically showing the seal-testing device of FIG. 2A mounted on the insulator, the joint being in the inflated state.

FIGS. 2A to 2C show the seal-testing device D1 mounted on the alpha part in two different states.

FIGS. 2A to 2C show in detail the door 22 of the alpha part. It includes a joint 23 mounted on the outer face 22.1 and on the outer periphery of the flange 18. The joint 23 extends both on the outer face 22.1 of the door and on its lateral edge 22.2. The joint 23 ensures on the one hand the sealing between the insulator door 22 and the insulator flange 18, and the sealing between the outer face of the insulator door 22 and the outer face of the container door 24, insulating these outer faces from the inside of the closed volumes.

The joint 23 is fastened onto the insulator door 22 via an annular bead 25 designated as "heel" mounted in an annular groove 21 formed in the insulator door 22.

The potential leaks can occur between the joint 23 and the insulator flange 18 symbolised by the arrow F1 and between the door 22 and the joint 23 at the mounting of the heel 25, symbolised by the arrow F2.

The testing device D1 is made to allow to detect the leaks F1 and F2. The testing device D1 includes a casing or head 36 defining a cavity 38 including a bottom 40, a lateral wall 42 and an opening 44 opposite the bottom. The cavity 38 extends along a longitudinal axis X1.

The casing 36 includes a groove 46 surrounding the opening 44 and an inflatable joint 48 mounted in the groove 46. In the non-inflated state (FIGS. 2A and 2B), the inflatable joint 48 advantageously does not protrude from the groove, reducing the friction during the connection of the testing device D1 onto the alpha part. Moreover, the joint is protected. For example, the inflatable joint 48 is glued by its face opposite the face intended to expand.

The inflatable joint is for example made from elastomer, for example from silicone, from styrene butadiene or SBR (styrene-butadiene rubber), from EPDM (ethylene-propylene-diene monomer), from fluoropolymer, for example from FKM, from hydrogenated nitrile or HNBR (hydrogenated nitrile butadiene rubber).

The diameter of the cavity is chosen so that the inflatable joint 48, in the inflated state, does not cover the zones of potential leakage F1 and F2 of the insulator. Preferably, the casing is such that it does not come in contact with the joint 23. The dimensions of the casing are such that the edge of the groove 46 adjacent to the opening 44, in other words, the wall between the groove 46 and the opening 44 does not come in contact with the joint 23. The positioning of the testing device D1 is ensured by fastening means, for example the bayonet fastening means; in the connected state the casing and in particular the inner edge of the groove 46 is sufficiently short to not touch the joint 23.

The testing device D1 includes means 50 for mechanical connection of the casing 36 onto the alpha part, in particular of the casing onto the insulator flange 18 so that the joint 48, in the inflated state, is in contact with the outer face 18.1 of the insulator flange 18.

Advantageously, the mechanical connection means 50 cooperate with the means for rigidly connecting the container flange 20 onto the insulator flange 18. In the example described, these are bayonet means. Thus the mechanical connection means 50 are identical to those carried by the container flange 20, since the device D1 is mounted on the flange in place of the container.

In the example shown in FIGS. 2A to 2C, the mechanical connection means thus include lugs 52 penetrating into a groove 54 of the insulator flange 18 and locking the two flanges 18, 20 in translation.

Alternatively, the mechanical connection means can be of the snap-on type, by screwing . . . .

The device D1 can also include means 56 for inflating the inflatable joint 48.

The means 56 include a fluid connection 60 between the inflatable joint 48 and for example a pneumatic pump. Very advantageously, the means 56 include monitoring means 64 for monitoring the pressure in the inflatable joint 48 with respect to a predefined setting, allowing to verify its state and/or the mounting of the device on the insulator flange 18.

For example the monitoring means 64 include a pressure switch. The pressure switch controls a loss of pressure. The predefined setting corresponds to the pressure value of inflation of the joint that was previously set. The pressure switch compares the predefined setting and the actual pressure measurement of the joint. When this difference between setting/measurement exceeds a threshold, for example if the joint is pierced, the pressure switch sends a signal, for example an alarm in the form of a light indicator. Thus it is possible to verify whether the pressure remains stable during the entire duration of the test and that the conditions of the test are valid. During the inflation, the pressure switch orders the stoppage of the pump when the inflation pressure of the joint is reached.

The device D1 includes for example a pump 62 for generating a certain level of pressure in the sealed cavity and means 58 for monitoring the change in the pressure level over time in the cavity 38 and carrying out the sealing test, associated with means for informing the operator of the change in the pressure in the form of a screen or of a light signal, the colour of which varies according to whether or not a leak has been detected.

The operation of the seal-testing device will now be described.

The testing device D1 is first of all moved close to the alpha part (FIG. 2A), then is rigidly connected to the alpha part (FIG. 2B), the inflatable joint 48 is in the deflated state. The mechanical connection means 50 cooperate with the insulator flange 18. In this example, the connection is obtained by bayonet means. For example, the device is axially moved close to the insulator flange 18, the axis X and the axis X1 are substantially colinear, then the casing of the device is pivoted about the axis X, ensuring an axial locking of the casing 36 on the insulator flange 18. Since the inflatable joint 48 does not protrude from the groove 46, it does not rub on the insulator flange 18, which reduces the friction facilitating the mounting and reduces the risks of damaging the joint, for example the risks of piercing of the latter (FIG. 2B).

Then, the inflatable joint 48 is inflated and comes in contact with the outer face 18.1 of the insulator flange 18 and ensures a sealed contact in the groove 46 and on the outer face 18.1. The pressure in the joint is advantageously monitored (FIG. 2C). The casing and the inflatable joint 48 define with the alpha part a volume V, the sealing of which with respect to the inside of the insulator is verified. The control means 58 are activated. A certain pressure is established in the cavity 38 and the change in its value is monitored. The volume V is typically several cm$^3$.

If the value of the pressure in the cavity 38 changes, it is considered that one or more leaks exist between the joint and the insulator door 22 and/or the flange 18. A signal alerts the operator if the sealing test is positive or negative.

During a sealing test, the inflatable joint 48 is for example inflated to a maximum pressure of approximately $2.10^5$ Pa and the pressure in the cavity is lowered for example to approximately −4000 Pa with respect to the outside.

The device D1 according to the invention allows to carry out more reliable tests.

Indeed, the inflatable joint is more flexible that an O-ring. It conforms to the bearing surface of the insulator flange as it is inflated. In the casing of defects on the bearing surface, for example a notch or a recess, the inflatable joint adapts and compensates for the surface defects to a certain extent. Thus the risks of false negative results caused by a defect in sealing between the testing device and the alpha part are greatly reduced.

Moreover, the testing device is more robust since the inflatable joint is protected in the groove and the risks of impacts, blows, scratches, notches harmful to the sealing test are reduced.

The implementation of an inflatable joint further has the advantage of having a larger contact surface and thus a sealing surface larger than that of an O-ring.

The mounting of the testing device is fast and relatively simple. The risks of incorrect tests are substantially reduced.

Figure 3A:
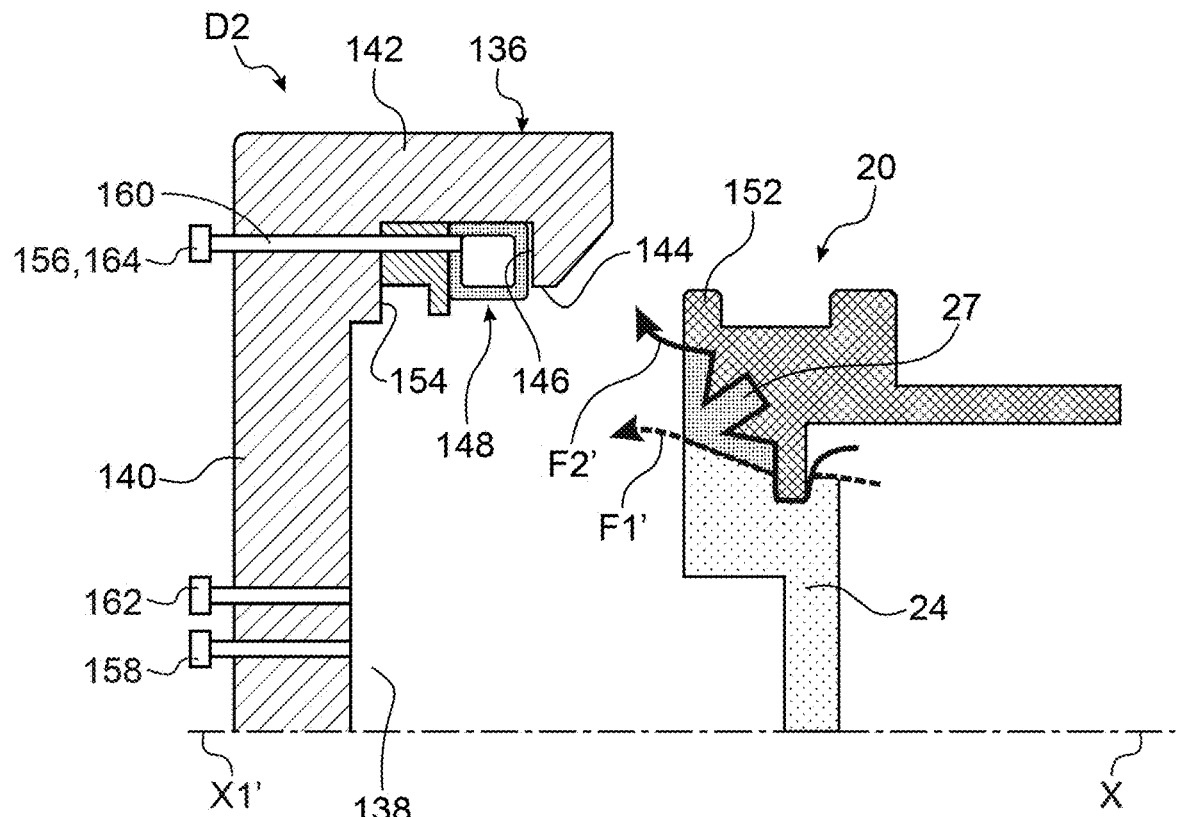
FIG. 3A is a longitudinal cross-sectional view schematically showing an example of a seal-testing device before its mounting on a container, the joint being in the non-inflated state.
Figure 3B:
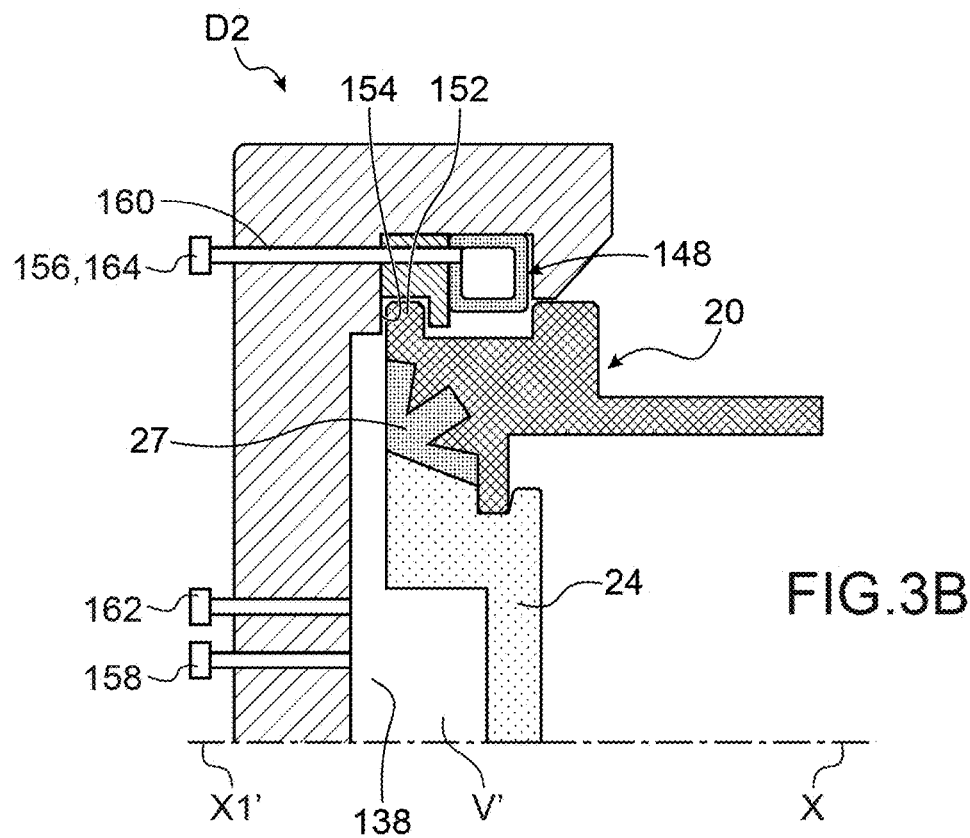
FIG. 3B is a longitudinal cross-sectional view schematically showing the seal-testing device of FIG. 3A mounted on a container, the joint being in the non-inflated state.

FIGS. 3A to 3C show a seal-testing device D2 specially adapted to the testing of sealing of a beta part. The container flange 20 includes a joint 27 similar to the joint 23 mounted on the insulator door 22.

The device D2 is very close to the device D1 in that it also implements an inflatable joint to define a sealed cavity with the beta part. It differs from the device D1 by the fact that the inflatable joint 148 comes in contact with the radially outer periphery of the container flange 20. The device D2 has a longitudinal axis X1'.

The casing 136 includes a cavity 138 defined by a bottom 140 and a lateral wall 142, an opening 144 having a diameter smaller than the inner diameter of the cavity so as to define a radial groove 146 in the casing housing the inflatable joint 148.

For example, the inflatable joint 148 is glued by its face opposite the face intended to expand. The inflatable joint 148 is glued to the bottom of the radial groove 146. The examples of materials given for the joint 48 apply to the joint 148.

Advantageously, the opening 144 has a bevelled radially inner edge facilitating the mounting of the casing on the beta part.

The mounting of the device on the beta part is such that a clearance is left between the free face of the beta part and the bottom 140 of the cavity 138 so as to create a test volume V' between the beta part and the device and avoid sealing the zones of potential leaks F1' and F2'. The volume V' is typically several $cm^3$. In the example shown in FIGS. 3A to 3C, the testing device D2 is configured to connect to a beta part by a connection of the bayonet type. In this example, the device D2 includes lugs 152 disposed in the radial groove 146 between the bottom of the cavity 138 and the joint 148 and cooperating with the outer peripheral edge of the container flange 20.

Alternatively, the mechanical connection means can be of the snap-on type, by screwing . . . .

Like the device D1, the device D2 can also include means 156 for inflating the inflatable joint 148.

The means 156 include a fluid connection 160 between the inflatable joint 148 and for example a pneumatic pump. Very advantageously, the means 156 include monitoring means 164 for monitoring the pressure in the inflatable joint 148 with respect to a predefined setting, allowing to verify its state and/or the mounting of the device on the container flange 20.

For example the monitoring means 164 include a pressure switch. The pressure switch controls a loss of pressure. The predefined setting corresponds to the pressure value of inflation of the joint that was previously set. The pressure switch compares the predefined setting and the actual pressure measurement of the joint. When this difference between setting/measurement exceeds a threshold, for example if the joint is pierced, the pressure switch sends a signal, for example an alarm in the form of a light indicator. Thus it is possible to verify whether the pressure remains stable throughout the duration of the test and that the conditions of the test are valid. During the inflation, the pressure switch orders the stoppage of the pump when the inflation pressure of the joint is reached.

The device D2 includes for example a pump 162 for generating a certain level of pressure in the sealed cavity and means 158 for monitoring the change in the pressure level over time in the cavity 138 and carrying out the sealing test, associated with means for informing the operator of the change in the pressure in the form of a screen or of a light signal, the colour of which varies according to whether or not a leak has been detected.

The test of sealing of the beta part with the device D2 is carried out substantially in the same manner as the test of sealing of the alpha part with the device D1. The device D2 is locked onto the beta part (FIG. 3B), the inflatable joint 148 is inflated (FIG. 3C) defining a volume V', the pressure of which is controlled.

In this embodiment of the device D2, the joint comes in contact with a bearing surface housed at the bottom of a groove that is relatively protected from possible impacts that a container can undergo during its manipulation. Moreover, this is a machined surface that thus has a good surface state and the surface is wide relative to the surface of the flange against which the testing devices of the prior art come in contact. The risks of poor sealing between the flange of the beta part and the inflatable joint during the test are substantially reduced.

Nevertheless, alternatively, the device D2 can be configured for the inflatable joint to come in contact with the front face of the flange, by using a container flange having a greater surface area. It is thus possible for the device for testing sealing of the alpha part to also be used to test the sealing of the beta part.

In the examples described, the connection between the testing device and the alpha part or the beta part is obtained by means of the bayonet type, which are the means for locking the insulator and container flanges to one another.

On the one hand, the testing device can be fastened onto the part to be tested by means different than those allowing the connection between the two flanges, however this complicates in particular the beta and/or alpha parts. For example the device can be fastened onto the part to be tested by screws, by a lever system, by snapping on.

On the other hand, the flanges can be locked to one another by means other than means of the bayonet type, for example means with a lever, with a cam, etc., Moreover, these means can cooperate with the testing device to ensure its fastening.

Using the means implemented to lock the two flanges to one another to fasten the testing device onto the part to be tested has the advantage of avoiding the operator having to manipulate various locking/fastening techniques which reduces the risks of poor manipulation.

What is claimed is:

1. Sealing test device for testing sealing of at least a part of a double-door sealed transfer system between two closed volumes, said system comprising first and second flanges capable of being rigidly connected to one another, and first and second doors normally sealing openings respectively defined by the first and the second flanges, the seal-testing device being configured to separately test the sealing between the first flange and the first door and between the second flange and the second door, said device including a casing comprising a cavity provided with an opening, means for mechanical connection to at least one of the first and second flanges so that the cavity is closed by one of the first and second flanges and one of the first and second doors, and an inflatable joint intended to come, in the inflated state, in contact with one of the first and second flanges and to ensure a sealing allowing to verify the sealing between the first flange and the first door or the second flange and the second door.

2. Seal-testing device according to claim 1, including means for inflating the inflatable joint and means for controlling the pressure in the cavity.

3. Seal-testing device according to claim 2, including a pressure switch to monitor the pressure in the inflatable joint.

4. Method for testing sealing of at least a part of a double-door sealed transfer system between two closed volumes implementing a device for testing sealing according to claim 2, the first flange and the second flange being disconnected from one another, said method comprising:
mechanically connecting the device for testing sealing onto the first or second flange;
inflating the inflatable joint to a given pressure;
cycling of controlling the pressure in the cavity; and
emitting a message on the sealing between the first flange and the first door or the second flange and the second door.

5. The method according to claim 4, including a step of monitoring the pressure in the inflatable joint throughout the duration of the test.

6. Seal-testing device according to claim 1, wherein the casing includes a groove bordering the opening of the cavity and receiving the inflatable joint.

7. Seal-testing device according to claim 6, wherein the inflatable joint, in the deflated state, is housed entirely in the groove.

8. Seal-testing device according to claim 6, wherein the groove opens into a face of the casing so that the inflatable joint, in the inflated state, comes in contact with a face of the first or second flange substantially parallel to the face of the first or second door.

9. Seal-testing device according to claim 6, wherein the groove opens into the cavity of the casing so that the inflatable joint, in the inflated state, comes in contact with the radially outer periphery of the second flange.

10. Seal-testing device according to claim 1, wherein the first and second flanges of the transfer system include means for locking to one another, and wherein the mechanical connection means advantageously cooperate with the locking means of at least one out of the first and second flanges.

11. Seal-testing device according to claim 10, wherein the mechanical connection means are of the bayonet type.

12. Seal-testing device according to claim 1, wherein the first flange and the first door are those of an insulator and wherein the second flange and the second door are those of a container.

13. Sealing test device for testing sealing of at least a part of a double-door sealed transfer system between two closed volumes, said system comprising first and second flanges capable of being rigidly connected to one another, and first and second doors normally sealing openings respectively defined by the first and the second flanges, the seal-testing device being configured to separately test the sealing between the first flange and the first door and between the second flange and the second door, said device including a casing comprising a cavity provided with an opening, a mechanical fastener that connects to at least one of the first and second flanges so that the cavity is closed by one of the first and second flanges and one of the first and second doors, and an inflatable joint intended to come, in the inflated state, in contact with one of the first and second flanges and to ensure a sealing, thereby permitting a verification of the sealing between the first flange and the first door or the second flange and the second door.

14. Seal-testing device according to claim 13, including a fluid that inflates the inflatable joint and a sensor that controls the pressure in the cavity.

15. Seal-testing device according to claim 14, wherein the sensor is a pressure switch that monitors the pressure in the inflatable joint.

16. Method for testing sealing of at least a part of a double-door sealed transfer system between two closed volumes implementing a device for testing sealing according to claim 14, the first flange and the second flange being disconnected from one another, said method comprising:
mechanically connecting the device for testing sealing onto the first or second flange;
inflating the inflatable joint to a given pressure;
cycling of controlling the pressure in the cavity; and
emitting a message on the sealing between the first flange and the first door or the second flange and the second door.

17. The method according to claim 16, including a step of monitoring the pressure in the inflatable joint throughout the duration of the test.

18. Seal-testing device according to claim 13, wherein the casing includes a groove bordering the opening of the cavity and receiving the inflatable joint.

19. Seal-testing device according to claim 18, wherein the inflatable joint, in the deflated state, is housed in the groove.

20. Seal-testing device according to claim 18, wherein the groove opens into a face of the casing so that the inflatable joint, in the inflated state, comes in contact with a face of the first or second flange substantially parallel to the face of the first or second door.

21. Seal-testing device according to claim 18, wherein the groove opens into the cavity of the casing so that the inflatable joint, in the inflated state, comes in contact with the radially outer periphery of the second flange.

22. Seal-testing device according to claim 13, wherein the first and second flanges of the transfer system include protrusions that lock the first and second flanges to one another, and wherein the mechanical fastener cooperates with the protrusions of at least one out of the first and second flanges.

23. Seal-testing device according to claim 22, wherein the mechanical fastener is of the bayonet type.

24. Seal-testing device according to claim 13, wherein the first flange and the first door are those of an insulator and wherein the second flange and the second door are those of a container.

\* \* \* \* \*